Jan. 31, 1950 G. LUBIN 2,495,746
THERMAL DISTORTION MEASURING MACHINE
Filed Feb. 19, 1945 5 Sheets-Sheet 1

INVENTOR.
George Lubin
BY
Ralph L. Chappell
ATTORNEY

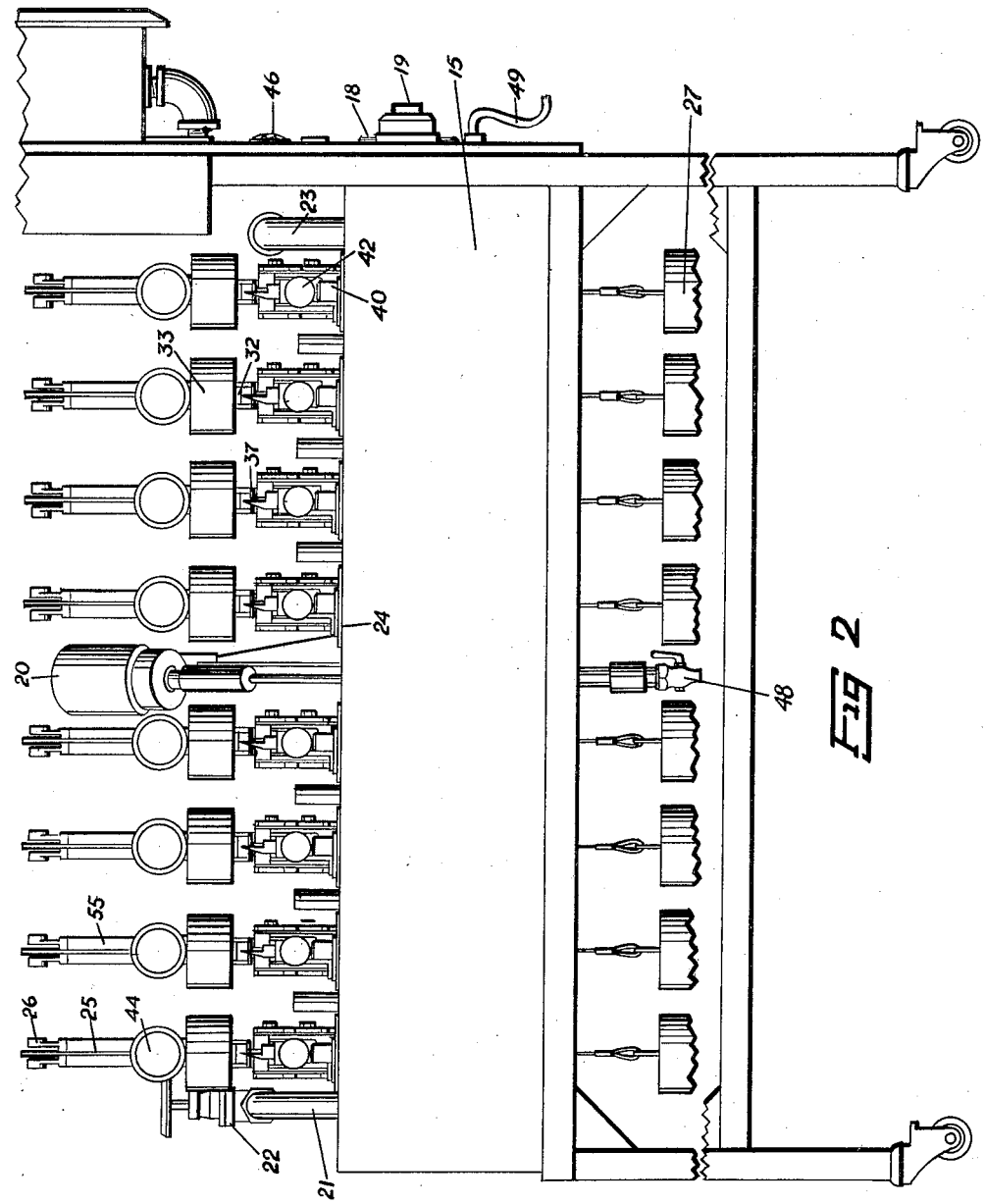

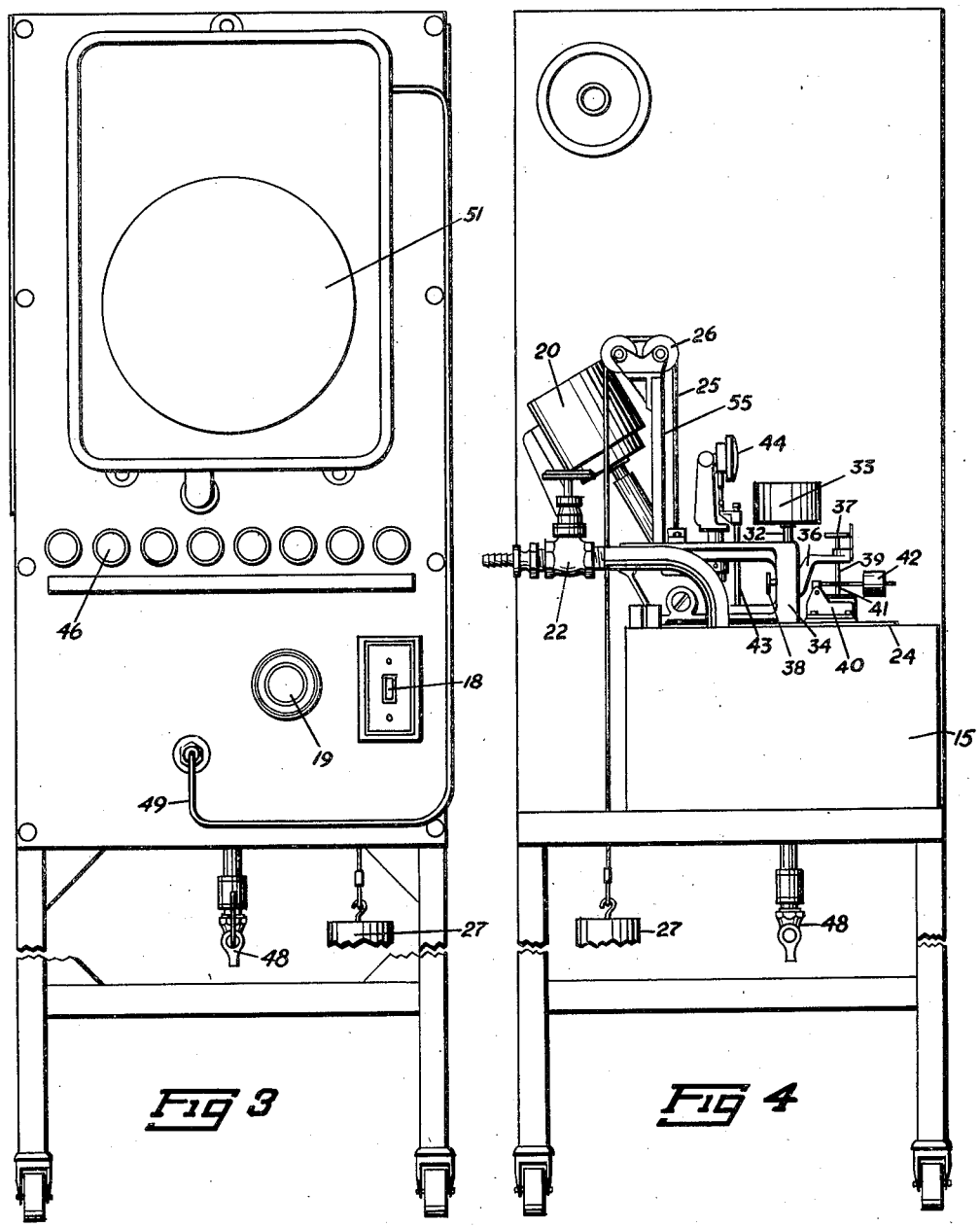

Jan. 31, 1950            G. LUBIN            2,495,746

THERMAL DISTORTION MEASURING MACHINE

Filed Feb. 19, 1945            5 Sheets—Sheet 4

INVENTOR.
George Lubin
BY
Ralph L. Chappell
ATTORNEY

Jan. 31, 1950  G. LUBIN  2,495,746
THERMAL DISTORTION MEASURING MACHINE
Filed Feb. 19, 1945  5 Sheets-Sheet 5

INVENTOR.
George Lubin
BY
*M. O. Hayes*

ATTORNEY

Patented Jan. 31, 1950

2,495,746

UNITED STATES PATENT OFFICE 2,495,746

THERMAL DISTORTION MEASURING MACHINE

George Lubin, New York, N. Y.

Application February 19, 1945, Serial No. 578,762

7 Claims. (Cl. 73—15.4)

(Granted under the act of March 3, 1883, as amended April 30, 1928; 370 O. G. 757)

This invention relates to apparatus for making precision measurements of distortion in solids resulting from the application of heat and pressure.

An object of this invention is to increase the accuracy of measuring the exact time and temperature at which a specimen under test distorts or yields a predetermined amount and to insure that there is no appreciable lag between the time of arrival and the time of recording the temperature on a suitable recording instrument.

Another object is to decrease the time required to make the tests, particularly with respect to simultaneous multiple tests, with no concurrent loss of accuracy.

Still another object is to reduce the hazard to the operator while operating the machine, and at the same time expedite the tests.

Further objects and advantages of this invention are apparent by reference to the following description in connection with the accompanying drawings, in which:

Fig. 1 is an isometric, partly sectional, view of one of the units, the parts being shown in elevation, Fig. 2 is a front elevation of a multi-unit assembly showing the tanks, pulleys, oil outlet and testing units assembled on rollers, Fig. 3 is a right-hand side elevation showing the control panel, Fig. 4 is a left-hand side elevation of the movable assembly, Fig. 5 is the electrical circuit and wiring diagram of a multi-unit assembly showing the connections for use with an eight unit machine, and Fig. 6 is a fragmentary schematic wiring diagram showing a fully automatic recording system.

Figure 1:
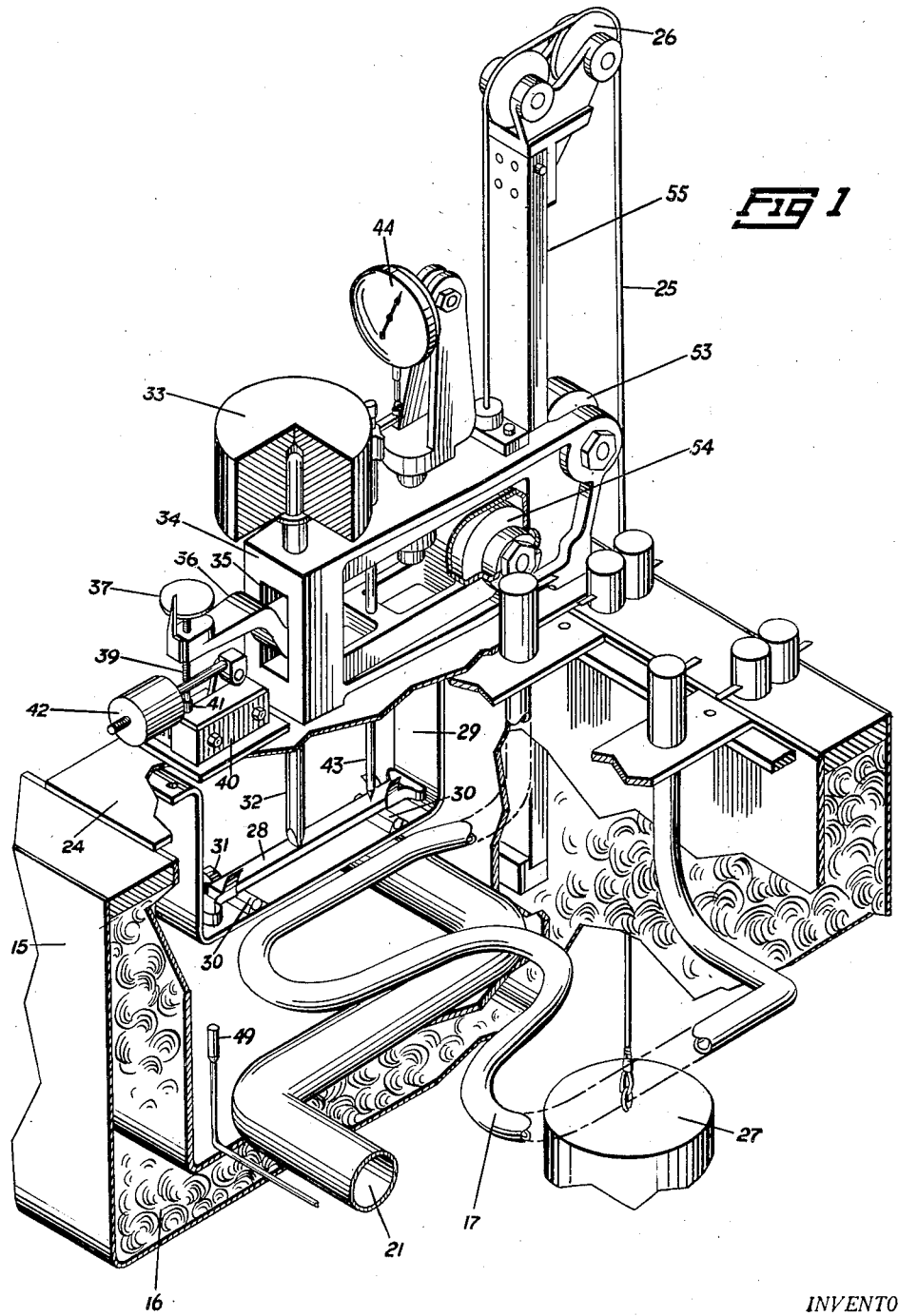

Fig. 2 shows eight testing units mounted in a double-walled tank 15 of suitable material with glass wool or other appropriate insulation 16 (Fig. 1) placed between the double walls of the tank. A heating coil 17 (Fig. 1), the energization of which is controlled by a line switch 18 and a heater rheostat switch 19, runs through the inner tank for heating the liquid such as, for example, oil, or other suitable material. A regulated source of heat is provided for heating at a predetermined rate and for maintaining the temperature of the bath, during the test, accurate to within about two degrees centigrade. A stirring motor 20 and associated paddle is placed at the center of the multi-unit apparatus to aid in maintaining a constant temperature throughout the bath. Although Fig. 2 shows a multi-unit thermal distortion measuring machine comprising eight units for testing eight different specimens, there is no restriction to the number that can be tested, eight merely having been selected arbitrarily as a convenient number for the construction of an experimental model. The tank 15 is provided with water pipes 21 of which 22 and 23 are respectively the inlet and outlet ends. The water pipes 21 are used in cooling the oil after the tests are over. Mounted upon the tank 15 is a shelf 24 forming a ledge on which a unit is secured. A cable 25 and pulley 26 with a counterweight 27 are so balanced that a unit can be raised out of the bath, or can be lowered gradually and gently into the bath. The pulley 26, cable 25, and counterweight 27 form a weighted balance so that the unit holding the specimen 28 can be raised or lowered, without securing, to any position.

In Fig. 1, which is a detailed drawing of one of the units shown on the movable assembly in Fig. 2, the ledge 24 supports on its underside a U-shaped bar 29 of suitable material such as Invar, whose expansion and contraction characteristics are practically unaffected by temperature changes. Secured to the U-shaped bar 29 are specimen supports 30 that can also be made of Invar and welded or otherwise secured to the base of the U-shaped bar. Further to support the specimen during the test, and also to expedite the placing and securing of a new specimen for another test, supporting clips 31 are secured to the upright arms of the U-shaped Invar bar 29. Mounted upon the plunger 32 is a weight 33 to apply to the specimen 28, the size of the weight being readily increased or decreased to suit the pressure needs of the test. On the top side of the ledge 24 is secured a rigid frame casting 34 that is slotted to receive the plunger 32 and that is also slotted as at 35 to receive a holder 36 for the micrometer 37 (Fig. 4). The plunger 32 and holder 36 are secured together by the screw 38 (as shown in Figure 4) so that any vertical motion transmitted to the plunger 32 is transmitted to the holder 36 and consequently to the screw 39 of the micrometer 37. Mounted on the shelf 24 beneath the micrometer 37 is a microswitch 40 that contains a plunger 41 to actuate the contact mechanism inside the switch. A rotatable weight 42 engages the microswitch plunger 41 and serves as an inertia mass to reduce the pressure of the microswitch spring.

In heating the specimen 28 a slight amount of swelling or volume expansion takes place. To detect and measure this, there is provided a rod 43 that transmits this swelling to a dial gauge 44. The necessary correction can then be readily interpolated on a correction chart.

Figure 5:
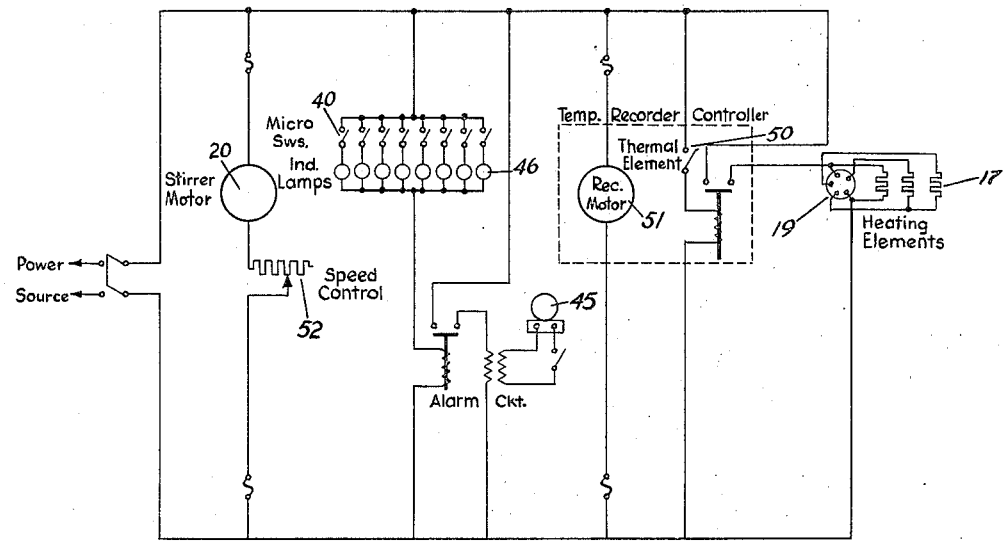

The closing of the contacts of the microswitch 40 sets off an alarm 45 (as shown in Fig. 5) so that the operator needs only to start one test, then remove the specimen 28 and jot down the data as soon as the alarm attracts his attention.

To perform the desired tests, the operator snaps the specimens 28 into place upon the supports 30 and adjusts the plunger 32 to its proper position. Meanwhile the retaining clips 31 hold the specimens 28 rigidly and prevent their slippage during the application of heat and pressure. The proper weight 33 is selected and placed on the head of the Invar plunger 32. With the tip of the Invar plunger 32 resting on the specimen 28 under test, and the micrometer 37 secured to the plunger 32 through its holder 36 and screw 38, the micrometer is adjusted by turning its graduated knob until the micrometer screw 39 contacts the switch plunger 41 and closes the microswitch, thus lighting an indicating lamp 46 on the panel board and simultaneously setting off an alarm. The micrometer 37 can be so graduated that a turn of ten divisions corresponds to 0.01 inch vertical translation of the micrometer screw 39. The micrometer 37 is then turned so that the tip of the screw 39 is a predetermined distance from the microswitch plunger 41. This distance varies with the needs of the particular test.

The specimen is now ready for insertion into the bath. To do this the operator lifts the counterbalance 27, thus lowering the frame casting 34 until the specimen 28 and U-shaped bar 29 are inside the thermal bath, the ledge 24 fitting snugly into the top opening of the tank and restricting the frame casting 34 from going any farther into the bath.

The operator then turns on the line switch 18 and the rheostat switch 19 thereby energizing the heating coils 17 that run through the tank 15 and serve to heat the liquid bath. The heating unit for the eight unit machine shows four combinations of parallel and series wiring arrangements as shown in the electrical diagram, (Fig. 5), the switch serving to vary the amount of heat needed for the test. Other means of controlled heat can be applied to the bath that differs from the one disclosed in this invention. More switches and more heaters, or different combinations of heaters and switches can be used, or gas burners or friction heaters can be substituted.

Figure 6:
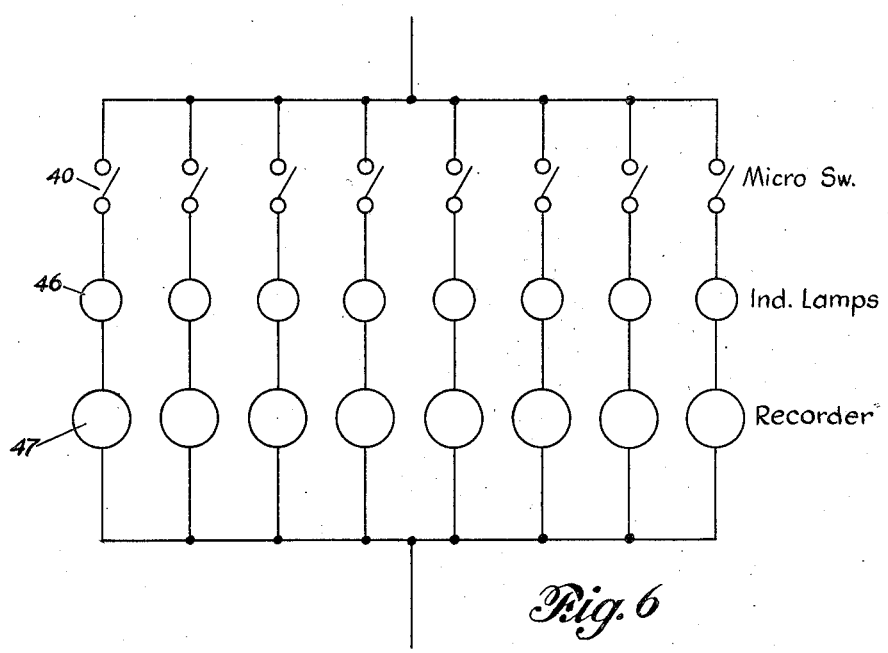
Figure 7:
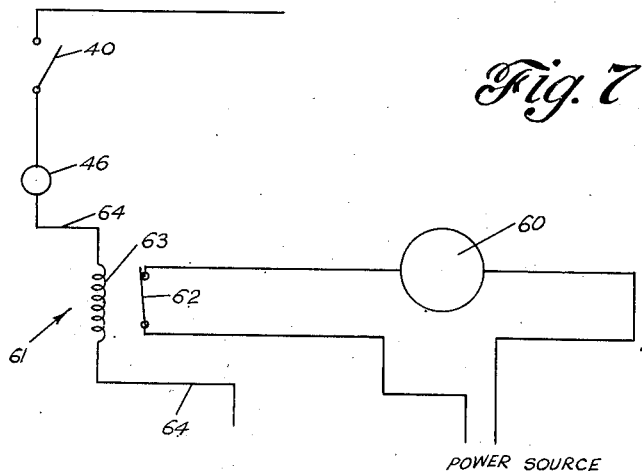
Fig. 7 is a schematic view of the recorder shown in Fig. 6.

When the specimen has distorted the predetermined amount, in response to the application of heat in this manner, the corresponding microswitch 40 is closed by the contact of the micrometer screw 39 with the plunger 41 of the microswitch 40, thus setting off an alarm and lighting the signal lamp 46 corresponding to the specimen that has distorted the predetermined amount. The operator notes the time and temperature, lowers the counterweight corresponding to the unit whose test was completed and removes the specimen. The machine can be made fully automatic after the specimens have been inserted by connecting a suitable recorder 47 in series with each of the microswitches 40 as shown in Fig. 6. This recorder 47 is adapted to record the time at which its corresponding microswitch 40 signaled the predetermined distortion of its corresponding specimen. Fig. 7 shows the suitable recorder 47 in detail, though it is understood that many other adequate types can be substituted for the one shown and described herein.

A clock mechanism 60 shown in Figure 7 is part of the time recorder shown broadly in Fig. 6. The clock mechanism 60, one for each micrometer switch 40, is shown to be electrically operable and is of the type that is manufactured to suit the particular voltage and frequency of the power line which supplies power to it. A relay switch 61 comprises a movable contact 62 and a coil 63, the latter coil 63 having its leads 64 in the micrometer switch circuit shown in Fig. 6. Hence, when a particular specimen has distorted a predetermined amount, the closing of its corresponding microswitch 40 will cause current to flow through the coil 63, which in turn will cause the movable contact 62 to move away from its fixed contact, breaking the clock circuit, so that the exact time of the specimen distortion can be noted.

When all the tests are completed, a flow of cold water is introduced in the pipes 21 cooling the multi-unit in preparation for the next test. Should the oil or other liquid used in the bath have to be changed, a run-off outlet 48 is provided.

Figure 8:
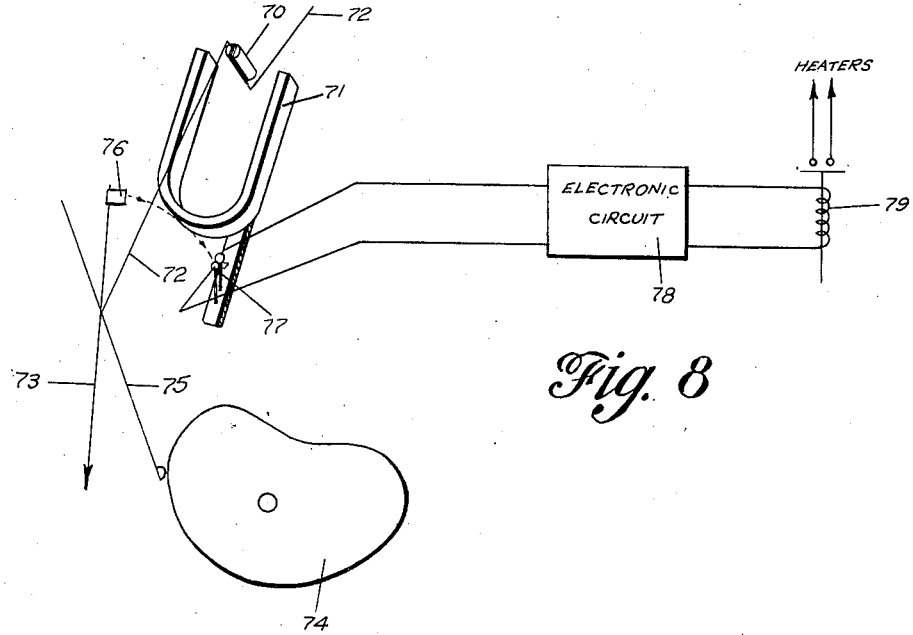
Fig. 8 is a schematic diagram of a conventional temperature recorder and control mechanism used with the present invention.

To insure automatic control of the heating a thermostatic element 49 is placed in the bath and activates the thermal element 50 (Fig. 5) the latter opening and closing the heating-element circuit in response to temperature changes in the bath. The thermostatic control and recorder 51 are of a conventional type comprising a circular chart with time and temperature coordinates, the chart being mounted on a clock shaft. Also mounted on the clock shaft above the chart is a cam that rotates with the recording chart and moves a temperature-setting arm at a constant rate. An arm, linked with the thermostat, has a stylus at one end and is used as a recording pen. In certain of the experimental tests the rate of heating was adjustable, varying from ½° C./min. to 2° C./min., although other rates of change of temperature with time can be used when desirable. Fig. 8 shows a schematic view of conventional temperature control and recorder, the latter mechanism being more fully delineated in the booklet "Instructions for Wheelco Instruments, Model 2212" published by the Wheelco Instruments Company of Chicago, Illinois. A coil 70 lies in the field of a magnet 71 and is moved by a current developed by the thermocouple 49, only the leads 72 of which are shown. The housing of the coil 70 moves the temperature indicating arm 73. A cam or contoured program disc 74 is rotated by a synchronous motor (not shown) through a reduction gear (not shown). The idler arm 75 rides on the periphery of the cam 74 so that a flag, coupled to the arms 73 and 75 which are in different planes, will move towards the parallel coils 77. The passage of the flag 76 between the parallel coils 77 will induce a voltage in the electronic circuit 78 so as to activate the relay 79 and shut off power to the heaters 17. As the temperature of the heaters 17 drops, the flag 76 moves away from the parallel coils 77, causing a change in the electronic circuit 78, and reactivating the heaters 17.

The stirring motor 20 has a rheostat control 52 (Fig. 5) for varying the speed of the motor when different volumes of liquid or oil are to be stirred. The combination of the stirring motor 20 and glass-wool insulation 16 serves to maintain a uniform temperature throughout the bath, so that at any instant, the temperature on the printed chart may be within about one degree centigrade of the actual temperature of the bath.

The rollers 53 and 54 frictionally support the frame 34 when the latter is lifted to any height on the support 55.

The machine of the present invention eliminates manual control and the necessity of requiring the operator to note the temperature when the deflection of a spring gauge indicates the required distortion of the sample. It also eliminates inaccuracy due to the dial gauge having errors directly attributable to the poor response of the spring. It also eliminates time-lag errors hitherto causing the temperature recording to be too fast at low temperatures and too slow at high temperatures. Such time-lag errors have hitherto caused temperatures to be recorded as much as 25° C. from the true instantaneous temperature of the specimen.

According to this invention it is possible to use a multi-unit machine having as many as twelve or twenty-four units capable of being safely watched by one operator. It avoids the necessity, in previous testing machines, of having to watch a deflection spring carefully to note the exact time at which the specimens distort a certain amount, thereby being limited by the restriction to observe only a few specimens at a time. Also, the use of an automatic recording chart and automatic heat-control leaves the operator free to use his time to check other features of the testing device, or even do work away from the machines. The weighted counterbalance for adjustably raising or lowering the specimen supporting frame without securing it expedites the removal and replacement of the specimens and diminishes the hazards in handling heated specimens and specimen supports.

This invention thus embodies a testing device that is relatively simple in construction as well as operation, adaptable to manufacture in various sizes and models, capable of making fine and accurate tests yet sufficiently sturdy to withstand jars and shocks due to careless handling by novices. It is also readily repaired, and greatly increases the number of tests that can be made in any given period of time.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a thermal distortion testing device, the combination of a frame, a specimen holder attached to said frame, retaining means for securing to said holder a specimen to be distorted, means for furnishing controlled heat to said specimen, variable weighted means arranged to apply pressure to the specimen through said frame, a micrometer device attached to and transmitting the motion of said variable weighted means, an electrical circuit containing a microswitch and a time-and-temperature recorder, said micrometer actuating said microswitch in response to the motion of said weighted means through a predetermined distance, said microswitch actuating said recorder to automatically record the time and temperature at which the specimen distorts said predetermined amount.

2. In a multi-unit thermal distortion testing device, the combination of a thermally controlled bath, supporting structure associated therewith, multiple slidable specimen-supporting frames adjustably balanced on said supporting structure to support specimens to be distorted, said slidable frames being lowerable individually or in groups into said bath, variable weighted means for applying distorting pressure to each specimen, micrometer attachments secured to and transmitting the motion of the variable weighted means, automatic means for recording time and temperature, and electrically-operated means responsive to the motion of said micrometer attachments through predetermined distances for actuating said recording means to record the time and temperature at which the specimen distorts a predetermined amount.

3. In a thermal distortion testing device, the combination of a movable frame adjustably balanced on an insulated supporting structure, specimen supporting and retaining means attached to said frame, means for furnishing controlled heat to said movable frame, means for applying a constant distorting pressure to a specimen secured to said specimen retaining frame, switch means actuated by predetermined movement of said distorting pressure means, and automatic means for indicating predetermined distortion in said specimen responsive to actuation of said switch means.

4. In a thermal distortion testing device, the combination of a movable frame adjustably balanced on and capable of insertion into an insulated supporting structure, specimen supporting and retaining means attached to said frame, means for furnishing controlled heat to said frame, means for applying a constant distorting pressure to said specimen, switch means actuated by predetermined movement of said distorting pressure means, a continuous temperature recording mechanism for recording the temperatures of said specimen, and automatic means for recording the time of distortion of said specimen, responsive to actuation of said switch means.

5. In a multi-unit thermal distortion testing device, the combination of a plurality of specimen supporting movable frames of Invar adjustably balanced on and capable of insertion into an insulated supporting structure, means for furnishing controlled heat to said specimen supporting Invar frames, constant distorting pressure means applied to each specimen, micrometer devices secured to and transmitting the motion of each of said distorting pressure means, a switch actuated by predetermined movement of said devices, a continuous temperature recording mechanism for recording the changing temperatures of said specimens during the application of controlled heat, and time recording means associated with each specimen supporting frame and responsive to the predetermined distance moved by each micrometer device so as to record the time of predetermined distortion of each specimen.

6. In a thermal distortion testing device, the combination of a movable frame, a specimen holder attached to said frame, retaining means for securing to said holder a specimen to be distorted, means for furnishing controlled heat to said specimen, variable weighted means arranged to apply distorting pressure to the specimen through said frame, a temperature recording mechanism, a time recording mechanism, and a micrometer device attached to and transmitting the motion of said variable weighted means, a switch responsive to predetermined movement of said micrometer device, said micrometer activating said switch and time recording mechanism in response to the motion of said weighted means and micrometer device through a predetermined distance due to the distortion of said specimen.

7. In a thermal distortion testing device, the combination of a frame, a specimen holder attached to said frame, means for furnishing heat to the specimen, weighted means arranged to apply pressure to the specimen through said frame, a member attached to and transmitting the motion of said weighted means, an electrical circuit containing a switch and a recorder, said member actuating said switch in response to the motion of said weighted means through a predetermined distance, said switch actuating said recorder to record automatically the conditions under which the specimen distorts a predetermined amount.

GEORGE LUBIN.

REFERENCES CITED

The following references are of record in the file of this patent:

UNITED STATES PATENTS

| Number | Name | Date |
|---|---|---|
| 1,122,239 | John | Dec. 22, 1914 |
| 2,019,313 | Lewis | Oct. 29, 1935 |
| 2,157,092 | Allen et al. | May 9, 1939 |
| 2,290,868 | Erikson | July 28, 1942 |
| 2,351,572 | Kingston | June 13, 1944 |
| 2,375,034 | Semchyshen | May 1, 1945 |
| 2,377,590 | Tatalay | June 5, 1945 |
| 2,436,317 | Manjoine | Feb. 17, 1948 |